Feb. 2, 1965  D. W. BERNARD ETAL  3,168,182
TYPE WHEEL SHIFTING AND INSPECTING MEANS IN HIGH SPEED PRINTERS
Filed March 21, 1963  5 Sheets-Sheet 1

INVENTORS.
JACOB A. RANDMER
DAVID W. BERNARD
BY

ATTORNEY

Feb. 2, 1965 D. W. BERNARD ETAL 3,168,182
TYPE WHEEL SHIFTING AND INSPECTING MEANS IN HIGH SPEED PRINTERS
Filed March 21, 1963 5 Sheets-Sheet 2

INVENTORS
JACOB A. RANDMER
DAVID W. BERNARD
BY
C. Garman Hubbard
ATTORNEY

Feb. 2, 1965  D. W. BERNARD ETAL  3,168,182
TYPE WHEEL SHIFTING AND INSPECTING MEANS IN HIGH SPEED PRINTERS
Filed March 21, 1963  5 Sheets-Sheet 3
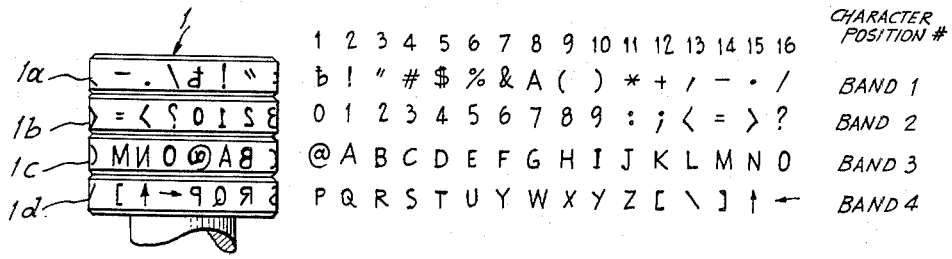
FIG. 5a.
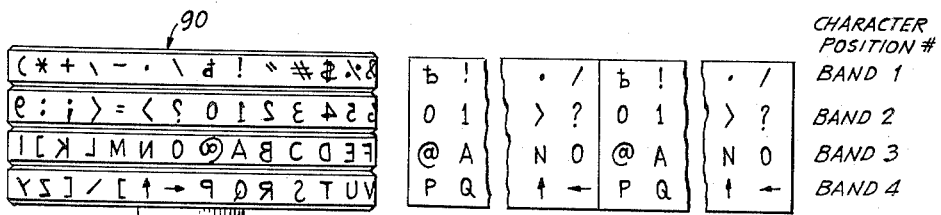
FIG. 5b.
FIG. 6a.
FIG. 6b.
INVENTORS.
JACOB A. RANDMER
DAVID W. BERNARD
BY
ATTORNEY

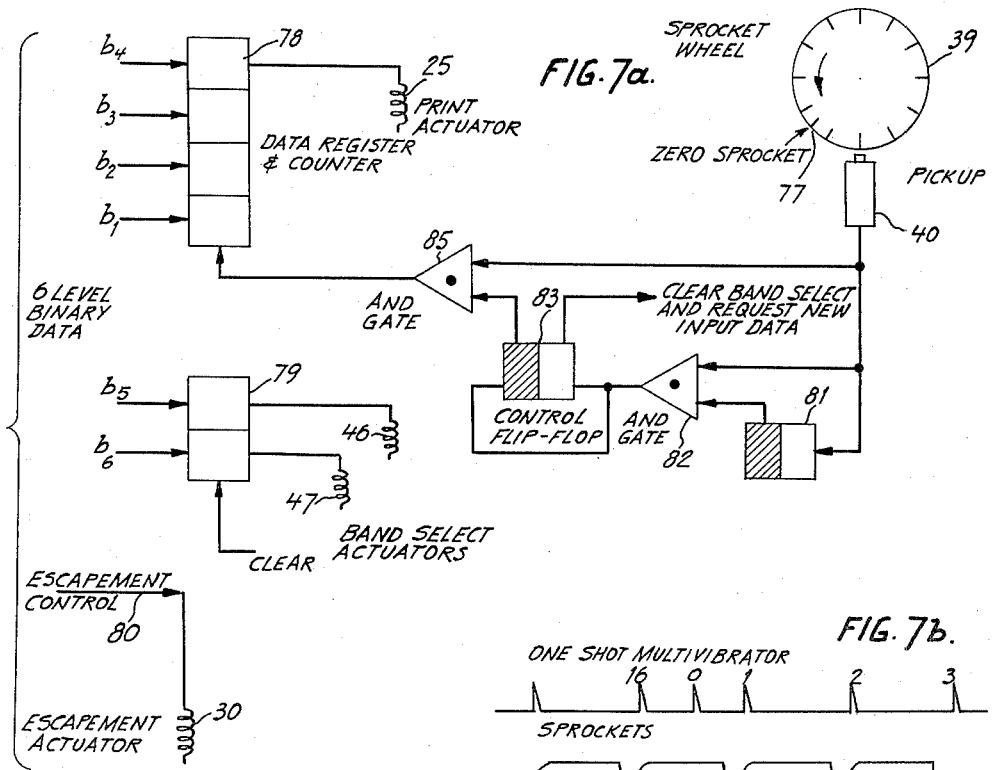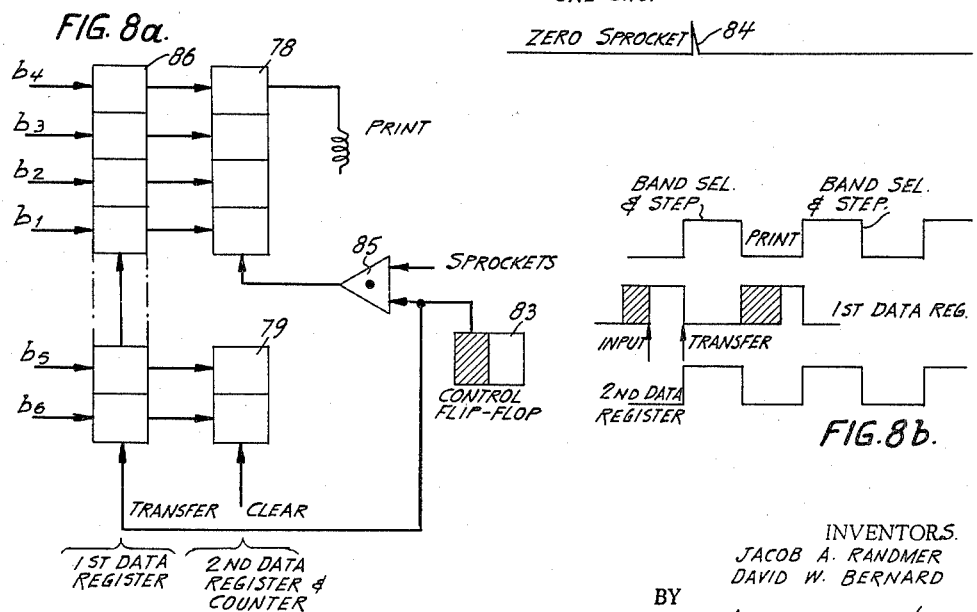

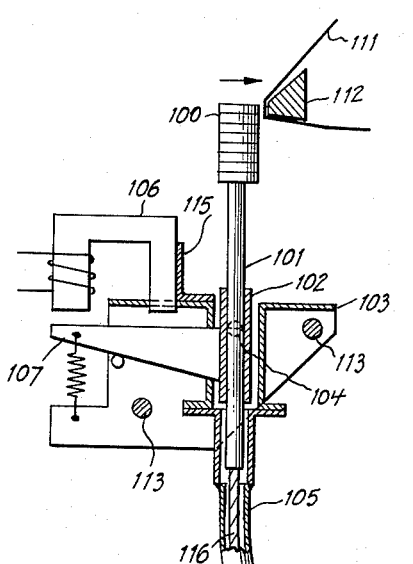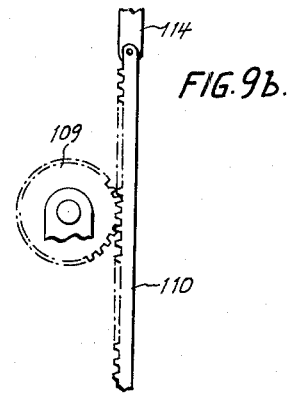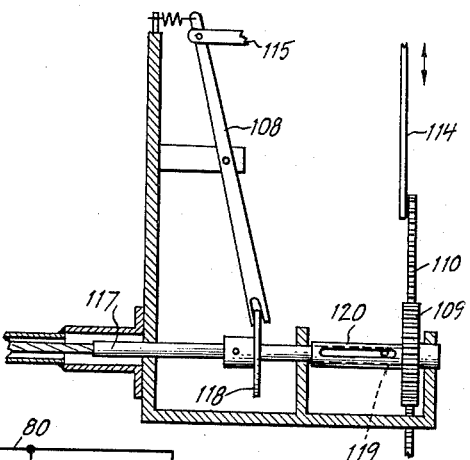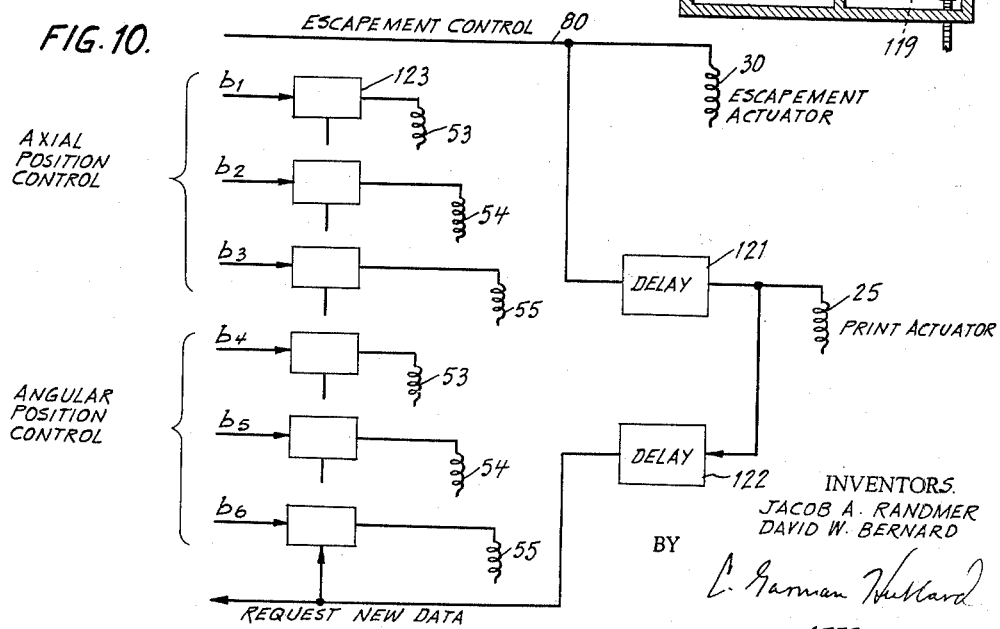

United States Patent Office 3,168,182
Patented Feb. 2, 1965

3,168,182
TYPE WHEEL SHIFTING AND IMPACTING MEANS
IN HIGH SPEED PRINTERS
David W. Bernard, East Rocks Road, Norwalk, Conn.,
and Jacob A. Randmer, 14 Exeter Lane, Wilton, Conn.
Filed Mar. 21, 1963, Ser. No. 266,983
20 Claims. (Cl. 197—55)

This invention pertains to high speed impact printers employing either the "on-the-fly" printing principle or the differentially settable type carrier technique. It is particularly applicable to character-serial high speed printers.

In a conventional "on-the-fly" impact printer, the type font is embossed on a rotating wheel or drum. Inked ribbon, paper and carbon tissue are interposed between the drum and a print hammer. A printed image of a character is produced on the paper and carbon copies by striking the paper against the continuously rotating print wheel (hence termed "on-the-fly" printing) when the desired character is passing in front of the hammer.

Using this principle, high speed printers have been built which are capable of printing about 1000 lines per minute, each line having about 130 characters. Such printers achieve their high speed by employing a type wheel with a complete font (usually 64 characters and symbols), a print hammer and hammer actuating means for each character position of the line. They are usually referred to as parallel high speed printers because of the parallel or simultaneous drive and operation of the mechanism at each print position. This means that the actual print speed for each mechanism servicing a print column is only about 17 characters per second. While such printers are extensively used as outputs for computers, they are expensive and can therefore not be employed economically for small systems particularly where a print rate of less than 100 lines per minute is acceptable. In order to reduce the cost, serial high speed printers have been proposed and built.

Instead of multiple print wheels, hammers, hammer impacting means, one for each lateral print position, a character-serial "on-the-fly" printer can utilize a single continuously rotating wheel and hammer both of which are stepped along the print line. However, the speed of such printers is limited by the following factors:

The impacting of the paper pack against the type wheel is not an instantaneous process but takes a finite time called contact time. Impact printers with moving type will produce a deformation or smear of the printed character in the direction of the type wheel motion. Also, if the hammer does not strike at just the right time, the character will be printed either above or below the print line, or will have a major portion missing (clipped). Both smear and clipping limit the speed which has been achieved with impact printers to 15 or 20 characters/second. This corresponds to a maximum surface velocity of the type wheel of 250 inches/second, and hammer contact times of 50–100 microseconds. Higher surface velocities or longer contact times or both result in unacceptable print quality. In order to produce higher print rates either the contact time must be reduced permitting a corresponding increase in surface velocity or the desired character must be positioned into the print zone faster, without increasing the surface velocity of the type wheel.

The first approach involving a decrease in contact time is difficult to achieve. Also, high type wheel surface velocities and reduced contact times require a stringent reduction in the electrical and mechanical timing tolerances of the machine which leads to teachnical complications and increased costs. It is more advantageous, therefore, to utilize the second approach, and this invention provides means for accomplishing this.

In order to obtain a much higher print rate, say of the order of 50 to 100 characters per second, the type font will be arranged, not in a single band around the type wheel but in two or more bands, each band containing only a part of the total type font. The proper band, containing the character to be printed, is selected during the time the printing mechanism is stepped from one position to the next. In this way, the peripheral velocity can be reduced by a factor of two, for two bands, three for three, etc., while maintaining the same print rate, or conversely, the print rate can be increased until a reasonable limit for surface velocity is reached. The combination of band selection with angular band displacement as a means for increasing the printing speed while maintaining high quality printwork is regarded as a basic feature of this invention. Generally, such a printer when employing "on-the-fly" techniques would operate as follows:

When the signal for the printing of a character is received, the print mechanism is stepped into the character position in which this character should be printed. This could be the next character on the line or a character several character spaces away from the last character printed. During the stepping the proper character band of the type wheel is moved or shifted into the print position while the type wheel is kept rotating at a uniform speed. This can be accomplished, for instance, by shifting the type wheel through a bail which runs across the width of the paper and engages with a groove in the type wheel. The proper band is determined by the machine logic from the character code. When the character to be printed is just passing in front of the character print position on the paper, the print hammer impacts the paper and inked ribbon against the type wheel. The location of a particular character in a band along the periphery of the type wheel can be determined by magnetic or optical sensing. The mechanism which positions the proper character band into the print position can also be used to move the print wheel and inked ribbon below the print line when printing is not in progress. This rest position for the print wheel will provide good visibility of the print line.

For similar reasons the multi-band arrangement of the type font is highly advantageous in serial printers operating with differentially settable type wheel techniques, i.e., when the type wheel is rotated into print position and then brought to rest prior to printing impact. In printers of this category the number of angular settings required to bring the entire type font into print position will be reduced by a factor of two for two bands, three for three bands, etc., thereby enabling a corresponding decrease in the time required for differentially setting the type wheel to result in a corresponding increase in printing speed.

The type wheel may be oriented in a variety of ways relative to the sheet being printed upon, for example, with its axis perpendicular to the print line or parallel with the print line. Also, the type wheel driving means may assume different forms such as gearing driven through a splined shaft to enable carriage travel, as shown in one embodiment of the invention, or a flexible drive shaft as shown in another embodiment of the invention.

It is, therefore, an object of this invention to enable higher printing speeds, with a character-serial form of printer.

A further object of the invention is to reduce the time required for a rotatable type carrier to bring the type font into print position without increasing the surface velocity of the carrier.

A still further object of the invention is to provide an improved type carrier capable of attaining higher printing speed and adaptable for mounting on an escapement driven carriage.

Additional objects of the invention together with the features contributing thereto and the advantages accruing therefrom will be apparent from the following description when read in conjunction with the drawing, wherein:

FIGS. 5a and 5b are side views of typical type wheels and the "roll-off" of the embossed characters on the type wheel showing the arrangement of the font or fonts in bands and character positions.

FIGS. 6a and 6b are tables relating a binary code to the characters on the print wheel.

FIG. 7a is a schematic of a control system for the character and band selection for a synchronous machine.

FIG. 7b shows the timing of the zero sprocket detection for synchronous operation.

FIG. 8a is the same as FIG. 7 but for an asynchronous system.

FIG. 8b is a timing diagram for asynchronous operation.

FIG. 9a is a sectional view similar to FIG. 3 but showing another embodiment of the invention employing a differentially settable type wheel technique.

FIG. 9b is a side elevation of part of the mechanism of FIG. 9a.

FIG. 10 is a schematic of a control system for the embodiment of FIG. 9a.

FIG. 11 is a plan view illustrating an alternate orientation of the type wheel relative to the print line.

Figure 1:
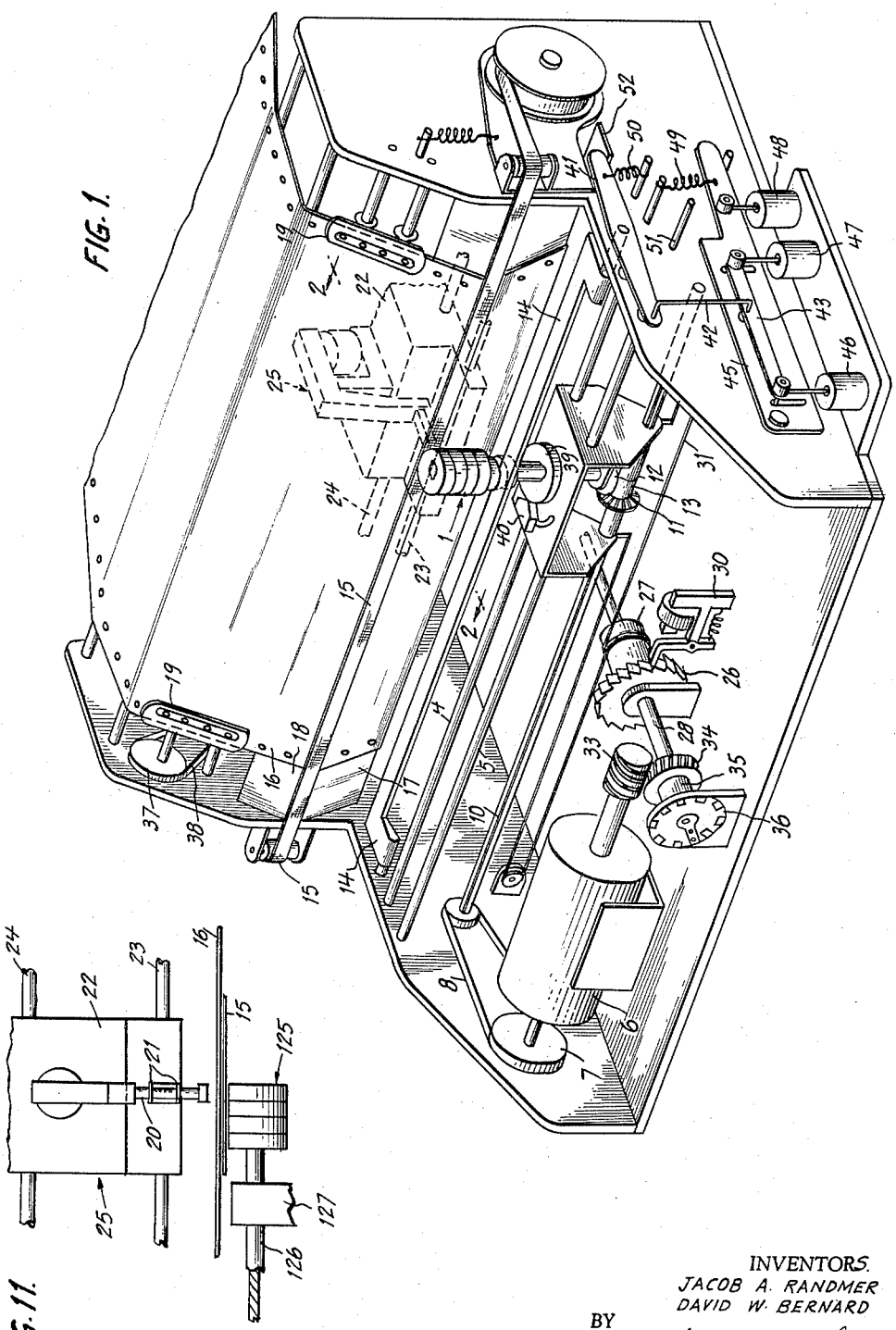
FIG. 1 is a perspective view of one embodiment of a character-serial printer with the covers removed so as to show the main parts of the mechanism in a schematic form.
Figure 2:
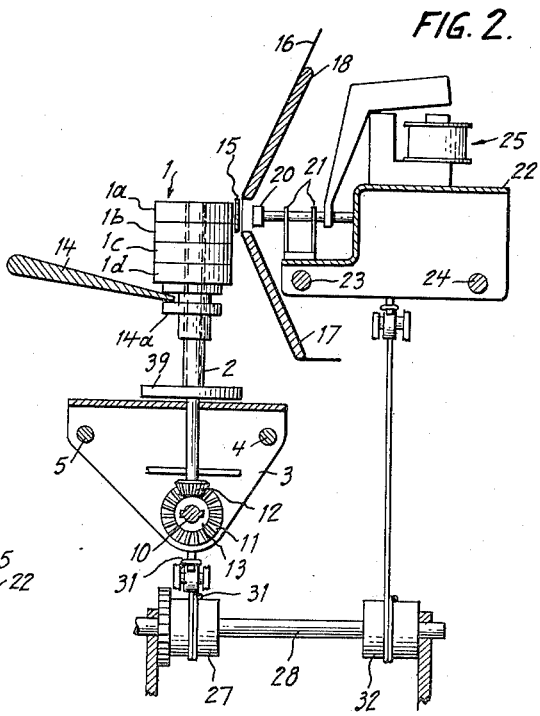
FIG. 2 is a sectional view along line 2—2 of FIG. 1 showing the type wheel, part of the type wheel drive mechanism, and the type wheel carriage and the print hammer, print actuator, and hammer carriage.

FIGS. 1 and 2 show a type wheel 1 which is supported by a splined type wheel shaft 2 and a type wheel carriage 3. This carriage is supported and can slide laterally along support shafts 4 and 5. The type wheel is driven by a motor 6 via pulley 7, belt 8, pulley 9, splined shaft 10, bevel gears 11 and 12, and the splined shaft 2. Gear 11 has an extended, splined hub 13 which can slide along the shaft while maintaining the rotation of the gear when the carriage is moved. The vertical position of the type wheel is controlled by a bail 14 engaging a grooved collar 14a integral with the type wheel. An inked ribbon 15 is stretched between the type wheel and a web of paper 16 which is supported by paper guide plates 17 and 18 and held in position by tractors 19. A print hammer 20 is located behind the paper and maintained in alignment with the print line and the type wheel by flexure springs 21 and the hammer carriage 22. This carriage is supported and can slide along support shafts 23 and 24. This carriage supports also the print actuator 25 which when energized propels the print hammer against the paper impacting the inked ribbon and the paper against the embossed type on the type wheel.

Both carriages 3 and 22 are always held in alignment with each other and are positioned laterally from one character position to the next by the carriage positioning mechanism. For illustration purposes a spring drum and escapement mechanism similar to those used in typewriters is shown in FIG. 1 although a clutch brake system or a positioning system with a servomotor could also be used. In FIG. 1, an escapement wheel 26 and a spring drum 27 are mounted on a shaft 28. The spring drum 27 is connected to the type wheel carriage by cable 31. Shaft 28 carries a second drum 32 which has the same diameter as drum 27 and which is connected by a cable to the hammer carriage in similar fashion as shown for the type wheel carriage. When the escapement is released by actuating an escapement actuator 30, the spring in drum 27 will turn the shaft and both drums 27 and 32 counterclockwise which will move the type wheel carriage and the hammer carriage in unison to the right. Carriage return can be effected by motor 6 via gears 33 and 34 and an electromagnetic clutch 35 which couples gear 34 to shaft 28. When this clutch is energized, the escapement mechanism is turned clockwise by the motor and both carriages are moved to the left. When the escapement actuator is energized only momentarily, the escapement armature 29 drops into the next tooth of the escapement thus permitting the carriages to move only by one character spacing. Translation of the carriages by several character spacings or by an entire line length can be accomplished by keeping the escapement actuator energized for a corresponding length of time.

An electrical distributor or commutator 36 associated with the escapement can be used with appropriate circuitry to control the stepping of the print head by more than one column position, providing a feature similar to the tabulate function of conventional typewriters. This control consists of energizing the escapement actuator and, rather than allowing it to drop into the next tooth, holds it energized until the distributor together with the special circuitry allows it to be deenergized.

Since this distributor is directly related to the column position of the print head on the printed line, it is also used to initiate signals to operate the clutch to return the carriage to the left margin, or any point in between, and also control the feed and line spacing of the paper. It can further be used to control entry of data from switches, plugboards and other data sources.

Instead of the electrical distributor, a magnetic drum, reluctance pickup or a photoelectric sprocketing arrangement could be used. Since such arrangements and the required associated circuitry are known in the art, no further details of the carriage positioning mechanism are described.

The paper advance from line to line is accomplished by tractors 19 but a pin roller or pinchroller arrangement could also be used. The tractors can be driven over pulley 37 and belt 38 from an elecrtomagnetically actuated ratchet mechanism or from a clutch brake system as is well know in the art.

FIG. 5a shows more details of the type wheel 1. For illustration purposes a sixty-four character font has been chosen which has been arranged on the type wheel in four bands 1a–1d containing sixteen characters each as shown in the "roll-off" in FIG. 5a. The vertical and horizontal spacing of the embossed characters on the type wheel is made sufficiently large so that shadow printing is avoided. The position of a character within a band can be detected by magnetic sensing with a magnetic drum 39 which is fastened to the type wheel shaft 2 and the pickup head 40, see FIG. 1. Alternatively, reluctance or photoelectric counting of sprockets could be used. All these methods are well known in the art. The type wheel is continuously rotated by the splined type wheel shaft 2 and can be moved axially along the shaft by bail 14 so as to align one of the four character bands with the print position opposite the print hammer. The position of the bail is controlled by lever 41, tie rod 42, lever 43, control plate 45, and actuators 46, 47, and 48 on the right side of the machine. When all actuators 46, 47, and 48 are deenergized springs 49 and 50 will pull the control plate 45 against stop 51. This will move the type wheel all the way down below the print line. Since lever 41 engages with the inked ribbon support plate 52, the ribbon will also be moved below the print line. This is the standby or idle position of the printer affording unobstructed visibility of the printing down to the line in the print position. For printing, actuator 48 is energized which will shift the first band 1a of the type wheel into the print position and raise the inked ribbon to the position as illustrated in FIGS. 1 and 2. If, in addition, both actuators 46 and 47 are energized, lever 43 will be pulled to the lowest possible position and hence the type wheel to the highest position so that band 1d reaches the print line. If actuator 46 is energized and 47 is not, the second band 1b will be in the print position. The third band 1c will be in the print position if actuator 47 is energized and 46 is not. The axial positioning of the type wheel can be accomplished while the carriages are being moved to the next print position. Thus a print cycle is normally divided into two periods. During the first period the print signal is received in the form of a code for a character and the carriages are moved to the escapement position in which this character is supposed to be printed. During the same time the proper band of the type wheel is selected and positioned. If the character is in the same band as the one printed before no axial repositioning of the type wheel is necessary. During the second period, the carriages are held in the new escapement position until the character to be printed is in print position so that the carbon ribbon and paper can be impacted against this character. This may take from a fraction up to a full revolution of the type wheel.

While for illustration purposes a type wheel with four bands each having sixteen characters has been used, other type wheel configurations having more or less bands are well feasible. For instance, a compound lever system as shown schematically in FIG. 4 can position a type wheel into eight discrete axial positions. This system consists of three actuators 53, 54, 55, levers 56 and 57, springs 58 and 59, control pivots 60, 61, 62, and output rod 63. Such systems are known in the art.

Generally, if there are $n$ number of control pivots the output rod can take $2^n$ discrete positions. Thus the three actuators can produce $2^3 = 8$ positions.

FIG. 5b shows an alternate arrangement of the font on a type wheel 90. For illustration purposes a four band type wheel is shown again but the font is repeated on the periphery of the type wheel hence making the diameter of the type wheel twice as large as for the one illustrated in FIG. 5a. Such a type wheel can be rotated at half the speed of the single font type wheel of FIG. 5d. However, it is obvious that this does not change the surface velocity of the type wheel.

Figure 3:
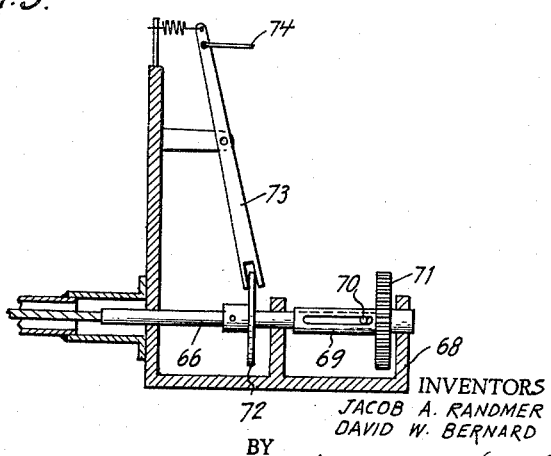
FIG. 3 is a sectional view similar to FIG. 2 but showing an alternate version of the drive mechanism.

FIG. 3 shows an alternate method of driving and axially positioning or shifting the type wheel with the aid of a flexible shaft 64. This flexible shaft 64 is fastened on one end to a splined shaft 65 carrying a four band type wheel 92. Shaft 65 is supported by bearing 67 and the code or sprocket wheel 76 and is moved laterally by a carriage 93. The other end of the flexible shaft 64 is fastened to a shaft 66 which is supported by a bearing block 68. This bearing block is fastened to the base of the machine. Shaft 66 can be rotated via the sleeve 69, pin 70 which is driven into shaft 66, and pulley 71. Since the pin 70 can slide in a slot provided for it in sleeve 69, the shaft 66 can also be moved axially by a plate 72 and lever 73. This lever can be connected with the rod 74 to a positioning mechanism similar to that shown in FIG. 4. Thus, the flexible shaft can be used to continuously rotate the type wheel and also to control its axial position. The flexible shaft housing 75 serves for protection and lubrication purposes. The code wheel 76 for sensing the character positions in a band is arranged on the type wheel end of the shaft in order to permit more accurate determination of the character position.

Selection of the character or symbol consists essentially of moving the print wheel axially to bring the band containing the character into alignment with the print line, and impacting the paper and inked ribbon against the embossed character as it spins by. To save time, the print wheel carriage mechanism and actuator carriage mechanism will move to the next escapement position along the line concurrent with the band selection.

For explanation purposes, the print wheel is assumed to have four print bands, each with sixteen characters or symbols for a total of sixty-four, although the system is not restricted to this configuration. See FIGS. 5a and 5b.

The sixty-four unique code combinations that are required are contained in a six level binary code. Four binary digits provide sixteen unique combinations that can be related to the sixteen characters in each character band. The remaining two bits provide four combinations which can be related and used to select each of the four bands.

It will also be apparent to one familiar with the art that an eight band print wheel, with eight characters per band or a two band print wheel with thirty-two characters per band, and many other combinations are also possible.

In certain applications for a serial printer such as with a manual keyboard, unrestricted visibility of the writing line is important, so this print wheel should actually have five axial positions, four for printing, and one well below the print line or line of sight. Since all sixty-four code combinations will be used to select the bands and characters within the band, the additional axial position must be provided for by another code level, or be subject to external control not related to the data code. External controls may also utilize a time delay to lower the print wheel after a fixed time period, such as one-half second.

One possible mechanism for band selection is shown in FIG. 1 and explained above.

FIG. 6a shows a possible arrangement of bands and their relation to a seven level code consistent with a proposed industry standard. The notation $b_1-b_7$ indicates the binary input code (bits) where a "1" is a signal and "0" is no signal. Bits $b_1-b_4$ give sixteenth unique combinations and correspond to the sixteen printing characters or symbols on each band. Band selection corresponds to combinations of bits $b_5$, $b_6$, and $b_7$. For example, referring to FIG. 6a, an input code "0110" (bits $b_4$, $b_3$, $b_2$, $b_1$) would indicate that any of the characters "&," "6," "F" or "V" could be printed. The addition of $b_7$ alone will select the 3rd band and the "F" will be printed. As indicated on the chart, a home position exists for nonprinting codes such as when bits $b_5$, $b_6$, and $b_7$ are all zeros, or when $b_5$ is 1 and $b_6$ and $b_7$ are zeros.

Figure 4:
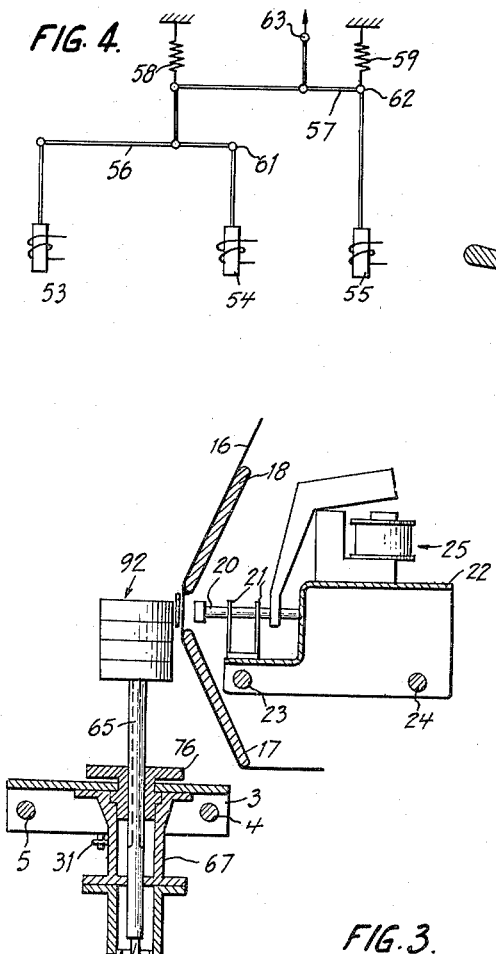
FIG. 4 is a schematic diagram of a mechanism suitable to position the type wheel into 8 discrete axial positions.

This system, using a seven level code, provides eight axial positions of the wheel, and would be used in conjunction with the selection system of FIG. 4. Code $b_5$ would control actuator 53, $b_6$ would control actuator 54 and $b_7$ would control actuator 55.

FIG. 6b shows the band selection described in conjunction with FIG. 1 using only a six level code.

Since the print wheel is continuously rotating, incoming data must either be received synchronously or be resynchronized by the printer control logic. In a synchronous mode, such as a computer output printer, the print mechanism itself signals the system to supply data synchronized with the position of the print wheel. In an asynchronous mode, such as a data communications line monitor or in keyboard service, incoming data must be stored internally until the print wheel is in position to accept it.

FIGS. 7a and 7b schematically show one possible control system for the band and charatcer selection for a synchronous machine, and FIGS. 8a and 8b show a system for an asynchronous mode.

Selection of the particular character on a band of the spinning print wheel is accomplished either by counting characters from an arbitrary zero position or by comparing the input code signals with similar signals generated by a code wheel device associated with the rotating print wheel.

The first method is preferred and described because of less massive parts and fewer electrical connections to the moving carriage.

As above-mentioned, associated with the rotating print wheel is a sprocket wheel 39 and pickup device 40 which generate pulses precisely related to each character around the periphery of the print wheel. See also FIGS. 1 and 2. One additional pulse is generated at a point 77 between the last and first character and is used to establish a zero position from which all characters can be counted. These sprocket pulses are counted electronically and at the proper time cause the print actuator to be energized, in turn impacting the paper, inked ribbon, etc. against the proper embossed character.

In FIG. 7a, the incoming six level binary data pulses are stored in a combined register and counter, possibly composed of transistor flip-flops. The first four stages 78, corresponding to $b_1$–$b_4$, are also capable of counting sprocket pulses in a serial fashion. The last two stages 79 simply store the input data and energize the band selection actuators 46 and 47. Entry of data also initiates one operation of the escapement mechanism to move the print head one column to the right. This is accomplished from a control signal entered over lead 80 with the data input codes, and it energizes the escapement actuator 30.

As above stated, an extra or zero pulse is generated between the last and the first character which is used to establish a zero position, from which all characters around the wheel can be determined by counting. One such scheme is shown in FIG. 7a consisting of a one-shot multivibrator 81, an "and" gate 82, and a control flip-flop 83. As shown in FIG. 7b, the time duration of the one-shot circuit is almost but not quite equal to the time between sprocket pulses. Thus, the zero sprocket pulse is the only one that occurs during the time the one-shot multivibrator 81 is energized, and when they are combined at the "and" gate 82 they produce a unique zero sprocket signal 84 for each rotation of the print wheel. This signal turns on the control flip-flop 83 which in combination with another "and" gate 85 allows subsequent sprocket pulses to enter and be counted in the data register and counter 78. The next zero pulse 84 resets the control flip-flop 83.

It must be noted that either the binary complement of incoming data $b_1$–$b_4$ is stored, or the characters must be arranged on the print wheel in the reverse order for this particular logic system. For instance, the character B, which has a code value of two (0010), must either be registered as sixteen minus two or fourteen, or must be in the fourteenth, rather than the second position from zero on the print wheel. An alternate would be to spin the print wheel in the reverse direction.

It also follows that the print wheel makes two revolutions for each character that is printed. During the first revolution, the band is selected and the print head stepped into the column to be printed. During the second revolution, actual printing occurs. The control flip-flop follows this alternation of cycles. It also follows that two or more identical fonts could be repeated in each band increasing the diameter while decreasing the rotational speed. The linear surface velocity will remain the same, and two zero sprockets 77 would be provided.

When the count reaches zero, the print hammer actuator 25 is energized, causing the hammer 20 to strike (see FIG. 1). Since the actuator system requires a finite time to move from its rest position and impact the paper against the print wheel, during which time the wheel is moving, any suitable provision may be made to advance or retard the sprocket pulse generation with respect to the position of the characters on the print wheel by adjustment of pickup 40. When the next zero sprocket pulse 84 occurs a new data request signal is generated by the control flip-flop 83 which causes the code for a new character to be entered into the Data Register 78 and 79.

Additional controls can be added to allow the print wheel to drop below the line of sight for slow manual typing only after an appropriate period without printing has elapsed (say ½ second).

FIG. 8a shows the schematic control for a version of the printer operation in which the data is not synchronous with the print wheel. In this case, a second data register 86 is added to store the data until the print wheel is in a position to accept it. Input data is stored in 86 and transferred to the data register and counter 78 and 79 when the zero sprocket pulse 84 is detected by the control flip-flop 83. Further operation is identical to that of FIG. 7a, explained above. The timing relationship of the two registers is shown in FIG. 8b.

It should also be noted that, providing input data is properly sequenced, the printer could operate equally well from left to right and right to left. The only requirement is that the stepping be controlled to coincide with band selection of the print wheel.

FIGS. 9a and 9b show another possibility for a character serial high speed print head employing a differentially settable mode of operation. It does not utilize a continuously rotating type wheel but uses a type wheel which is stationary after the proper character has been positioned into the print position. An explanation of its operation is as follows:

The type wheel 100 carries an embossed font of sixty-four characters in eight bands, each band containing eight characters. Of course, a different number of total characters, number of bands and number of characters in a band is possible. The above print wheel with eight bands having eight characters each is used merely for illustration purposes. Type wheel 100 is supported by type wheel shaft 101 which can rotate and move axially in bearing sleeve 102. The bearing sleeve is pivoted on pivot 104 which permits sleeve 102 and with it shaft 101 and the type wheel 100 to pivot through a small angle in a plane perpendicular to the paper guide 112 and the paper 111. By energizing actuator 106, the armature 107 is pulled in, tilting sleeve 102 and impacting the type wheel against the inked ribbon and the paper. The actuator and type wheel assembly is supported on carriage 103 which slides on shafts 113 parallel to the print line on the paper. Carriage motion can be controlled in a similar fashion as illustrated in FIG. 1 for the type wheel carriage 3.

Type wheel shaft 101 is fastened to a flexible shaft 116 contained in a housing 105 which leads from the movable carriage 103 to a stationary positioning mechanism mounted appropriately in the machine and is fastened there to shaft 117. This shaft can be moved axially by disc 118 and lever 108 and rotated via pin 119, sleeve 120, gear 109, and rack 110. Tie rods 115 and 114 are fastened each to a separate positioning mechanism such as shown in FIG. 4. The shaft 117 and with it the type wheel can therefore be positioned into eight discrete axial and eight discrete angular positions so that any desired character of the sixty-four character font can be presented to the print position.

A possible control scheme is shown in FIG. 10. The input data register 123 stores the incoming data bits $b_1$–$b_6$. The actuators 53, 54, 55 of related positioning mechanisms of the sort shown in FIG. 4 are controlled by $b_1$–$b_3$ and $b_4$–$b_6$, respectively. The escapement control signal over lead 80 energizes the escapement actuator 30 at the same time the print wheel is being positioned. This signal also goes to a device 121 which energizes the print actuator 25 after a suitable delay. Another delay stage 122 clears the input data register 123 after printing has taken place and signals for the next character.

For asynchronous operation, another input register is required for temporary storage of data.

It will of course be understood that although FIG. 9a illustrates one manner of actuating the type wheel to cause printing impact, the differentially settable mode of operation described in connection therewith could instead employ a carriage mounted type hammer and hammer actuator such as shown in the embodiment of FIG. 3.

FIG. 11 is a plan view illustrating an alternative manner of mounting a type wheel relative to the print line and which may be employed in either the continuously rotating or differentially settable modes of type wheel drive. As shown in FIG. 11, a multi-band type wheel 125 is attached to the end of a flexible shaft 126 mounted in a support 125 on a carriage, not shown, but similar in function to the carriage of FIG. 3. In this embodiment, however, the type wheel 125 is mounted with its axis parallel to the print line. The type wheel may be driven and axially shifted in the same manner as described in connection with the FIG. 3 embodiment and operates in cooperation with a carriage mounted type hammer and actuator such as shown and described in connection with the FIG. 3 embodiment. Axial shifting of the type wheel 125 acts to move a selected band of the wheel into register with the hammer 20.

While there has been shown and described what are believed to be preferred embodiments of the invention, it should of course be understood that various changes in form could obviously be made without departing from the spirit of the invention, and it is therefore intended that the invention be not limited to the exact forms herein shown and described nor to anything less than the whole of the invention as hereinbefore set forth and as hereinafter claimed.

What we claim and desire to secure by Letters Patent is:

1. In a high speed printer adopted for serially recording selected characters of a type font along the print line of a record medium, a type wheel formed with said type font contained in a plurality of individual bands of type arranged circumferentially about said type wheel, carriage means mounting said type wheel adjacent to said record medium and movable along a path parallel to said print line, means for spacing the travel of said carriage means in increments corresponding to the letter spacing of said print line, means for axially shifting said type wheel on said carriage to bring a selected band of said wheel into printing alignment with said print line, means for rotating said wheel to register a selected character type of the selected band into print position relative to said print line, means effective when the selected type is at said print position for impacting said selected type with said record medium to cause a character imprint by said selected type within the print line of said record medium, and circuit means responsive to simultaneous parallel input of pulses indicative of coded representations of said characters for controlling said shifting means and said impacting means.

2. In a high speed printer adapted for serially recording selected characters of a type font along the print line of a record medium, a type wheel formed with said type font contained in a plurality of individual bands of type arranged circumferentially about said wheel, each of said bands being axially offset on said wheel relative to the other, means for axially shifting said type wheel to bring a selected band of said wheel into printing alignment with said print line, means for continuously rotating said wheel to register a selected character type of the selected band into print position relative to said print line, means effective when the selected type is at said position for impacting the selected type with the record medium to cause a character imprint by said selected type within the print line of said record medium, and carriage means for supporting said type wheel and said impacting means in register with said print line, said carriage means being movable in spaced increments to bring said print wheel and said impacting means into alignment successively with the letter space positions of said print line.

3. The invention according to claim 1 wherein the means for axially shifting said type wheel on said carriage includes a plurality of actuators operating through a system of compound levers and energizeable in a variety of combinations to axially shift said type wheel a corresponding extent to bring the selected band of said wheel into printing alignment with said print line.

4. The invention according to claim 1 wherein said type wheel is mounted on said carriage means with the axis of said type wheel oriented perpendicularly to said print line.

5. The invention according to claim 1 wherein said type wheel is mounted on said carriage means with the axis of said type wheel oriented parallel to the print line.

6. In a high speed printer adapted for serially recording selected characters of a type font along the print line of a record medium, a type wheel formed with said type font contained in a plurality of individual bands of type arranged circumferentially about said wheel, carriage means mounting said type wheel adjacent to said record medium and movable along a path parallel to said print line, means for spacing the travel of said carriage in increments corresponding to the letter spacing of said print line, means for axially shifting said type wheel on said carriage to bring a selected band of said wheel into printing alignment with said print line, means for continuously rotating said wheel to register successively the character type of the selected band into printing position relative to said print line, means for impacting the selected band of said wheel with said print medium for causing a character imprint in the print line of said record medium, and circuit means responsive to pulses corresponding to distinct character codes for controlling said shifting means and timing the operation of said impacting means for causing a character imprint by a selected character type in the selected band of said type wheel.

7. The invention according to claim 6 wherein the means for axially shifting said type wheel includes a plurality of actuators operating through a system of compound levers and energizeable in a variety of combinations for determining the extent of axial shifting of said type wheel.

8. The invention according to claim 6 wherein said type wheel is mounted on a splined shaft for enabling axial shifting thereof relative to said shaft and wherein the axial shifting movement of said type wheel is effected by a rockable bail operatively engaging said type wheel in each letter spacing position of said carriage.

9. The invention according to claim 8 wherein said bail is operated by a system of compound levers controlled by a plurality of actuators energizeable in a variety of combinations for determining the extent of shifting of said type wheel.

10. The invention according to claim 6 wherein said type wheel is mounted on a flexible shaft, said shaft being axially displaceable for effecting the axial shifting of said type wheel.

11. The invention according to claim 10 wherein the means for axially displacing said shaft includes a plurality of actuators operating through a system of compound levers and energizeable in a variety of combinations for effecting a corresponding extent of shifting of said type wheel.

12. In a high speed printer adapted for serially recording selected characters of a type font along the print line of a record medium, a type wheel formed with said type font contained in a plurality of individual bands of type arranged circumferentially about said wheel, carriage means mounting said type wheel adjacent to said record medium and moveable along a path parallel to said print line, means for spacing the travel of said carriage in increments corresponding to the letter spacing for said print line, means for axially shifting said type wheel on said carriage to bring a selected band of said wheel into printing alignment with said print line, means for imparting differential extents of rotation to said type wheel to register a selected character type of the selected band into print position relative to said print line, means effective when the selected type is differentially set at said print position for impacting the selected type with said record medium to cause a character imprint by the selected type within the print line of said record medium, and circuit means responsive to simultaneous parallel input of pulses indicative of binary code representations of said character types for controlling said shifting means, said rotation imparting means and said impacting means.

13. The invention according to claim 12 wherein the means for rotating said type wheel differential extents include a plurality of actuators operating through a system of compound levers and energizeable in a variety of combinations for imparting differential extents of rotation to said type wheel.

14. The invention according to claim 12 wherein said type wheel is mounted on a flexible shaft axially displaceable for shifting a selected band of said type wheel into printing alignment with said print line, said shaft being axially displaceable different extents by a plurality of actuators operating through a system of compound levers and energizeable in a variety of combinations for determining the extent of displacement of said shaft.

15. The invention according to claim 12 wherein said type wheel is mounted at one end of a flexible shaft, said flexible shaft end being supported in a pivotal member, and said impacting means including an actuator energizeable for pivoting said member to axially deflect said shaft and said type wheel and cause said type wheel to impact said record medium.

16. The invention according to claim 12 wherein said type wheel is mounted on said carriage means with the axis thereof oriented perpendicularly to the print line.

17. The invention according to claim 12 wherein said type wheel is mounted on said carriage means with the axis thereof oriented parallel to said print line.

18. The invention according to claim 6 wherein each character type of said type wheel is assigned a distinct binary code representation consisting of a first group of bit positions identifying the angular position of the respective character type about the axis of said type wheel and a second group of bit positions identifying the band containing the respective character type, said circuit means including register means for receiving and storing pulses according to a binary code representation, and means for generating sprocket pulses synchronized with the advance of successive character types into print position, the portion of said register means storing said coded representation of said second group of bit positions selectively activating said shifting means, the portion of said register means storing the coded representation of said first group of bit positions also including pulse counting means effective upon receiving a number of said sprocket pulses corresponding to the stored binary coded representation for activating said impacting means to cause imprint of the character type thus selected on said print medium.

19. The invention according to claim 18 wherein said circuit means includes means for recognizing a distinct one of said sprocket pulses generated at a predetermined angular position of said type wheel as a zero sprocket pulse, said zero sprocket pulse activating a control element to enable said register means to start a count of said sprocket pulses.

20. The invention according to claim 12 wherein each character type of said type wheel is assigned a distinct binary code representation consisting of a first group of bit positions identifying the angular position of the respective character type about the axis of said type wheel and a second group of bit positions identifying the band containing the respective character type, and including first and second register means for receiving and storing pulses according to said first and second groups, respectively, of bit positions in said code representation, said first register means controlling the means for rotating said type wheel into a differentially set position, said second register means controlling the means for axially shifting said type wheel to align a selected band with the print line of said record medium.

References Cited by the Examiner

UNITED STATES PATENTS

| | | | |
|---|---|---|---|
| 1,652,463 | 12/27 | Tyberg | 197—16 |
| 2,077,962 | 4/37 | Smith | 101—58 |
| 2,079,337 | 5/37 | Roe et al. | 197—49 |
| 2,127,251 | 8/38 | Fischer | 197—55 X |
| 2,621,772 | 12/52 | Reppert | 197—49 X |
| 2,757,775 | 8/56 | Hickerson | 101—110 X |
| 2,919,002 | 12/59 | Palmer | 197—16 |
| 2,941,188 | 6/60 | Flechtner | 101—93 X |
| 3,013,119 | 12/61 | Brown | 101—93 X |
| 3,085,670 | 4/63 | Paige | 197—16 |

WILLIAM B. PENN, *Primary Examiner.*